United States Patent Office 2,812,316
Patented Nov. 5, 1957

2,812,316

POLYMERIZATION OF BUTADIENE-ACRYLONITRILE

Bailey Bennett, Louis E. Novy, and Palmer B. Stickney, Columbus, Ohio, assignors, by mesne assignments, to the United States of America as represented by the Secretary of the Army No Drawing. Application March 15, 1954, Serial No. 416,443

3 Claims. (Cl. 260—82.7)

This invention relates to improvements in aqueous synthetic rubber emulsion polymerization at high temperatures and, in particular, to a process for obtaining butadiene-acrylonitrile copolymers having an exceptional balance of oil resistance, low temperature, and stress-strain properties.

In the past, it has been the practice to prepare elastomeric copolymers of butadiene-acrylonitrile at relatively low polymerization temperatures, that is, generally in the neighborhood of 50° C., using mercaptans as modifiers in the elastomer formation. These relatively low polymerization temperatures were necessary in order to obtain copolymers having good physical properties. However, the prior-art processes using low polymerization temperatures have certain well-known disadvantages, as enumerated below, which the present invention is intended to overcome.

A disadvantage of these prior-art processes is that they are not satisfactory if it is desired to carry out emulsion polymerization of butadiene-acrylonitrile at high temperatures, that is, temperatures considerably in excess of 50° C. and in the preferred range of 90 to 150° C. When these conventional processes, involving recipes which utilize polymerization initiator concentrations of about 0.2 to 1.0 percent, are used at high polymerization temperatures, the initiator is decomposed very rapidly with a resulting "dying-out" of the polymerization reactions. That is, the initiation, propagation, and termination reactions level off very quickly when the source of free radicals, the initiator, is depleted.

Another disadvantage of these conventional systems at high polymerization temperatures is the lack of control of polymerization temperature. The rapid initiator depletion leads to very rapid initial polymerization, followed by early "dying-out" of the reactions. This initial rapid reaction leads to tremendous heat build-up which is virtually impossible to control.

Still another disadvantage is that inferior products are obtained from such uncontrolled reactions. Copolymers obtained in this manner show decreased tensile strengths and elongation values, while Mooney viscosities and modulus values are increased significantly. These are all changes in properties which are undesirable in synthetic elastomer formation.

Still another disadvantage is that butadiene-acrylonitrile elastomers obtained from low-temperature polymerizations do not show the optimum balance of oil resistance and low-temperature properties when compounded and vulcanized.

Also a disadvantage of the low-temperature polymerization processes is that they are not completely satisfactory for use in continuous emulsion polymerization processes which must be carried out at high temperatures. A satisfactory continuous polymerization process requires rapid conversion to the elastomer, but further requires a rapid conversion which is both controllable and reproducible. These conditions are not met when the conventional, low-temperature processes are run at considerably increased temperature levels.

It is, therefore, an object of this invention to provide a new and useful method of preparing elastomeric copolymers of butadiene-acrylonitrile having an exceptional balance of oil resistance, low temperature, and stress-strain properties, in aqueous emulsions at high temperatures.

Another object of this invention is to provide a method of control over the formation of butadiene-acrylonitrile elastomers at elevated polymerization temperatures.

Another object of this invention is to provide a synthetic oil-resistant elastomer that, when compounded and vulcanized, will exhibit the optimum balance of oil resistance and low-temperature properties.

Still another object of this invention is to provide a method of continuous high-temperature emulsion polymerization. Systems have been devised which afford both controllable and reproducible emulsion polymerization of butadiene-acrylonitrile at high temperatures.

Further objects and advantages of the present invention will be apparent from the following detailed disclosure and description thereof.

The present invention relates to the process, and the product produced thereby, of polymerizing a material selected from the group consisting of 1,3-butadiene hydrocarbons and mixtures of 1,3-butadiene hydrocarbons with acrylonitrile in aqueous emulsion in the presence of mercaptan compounds.

It has been found in the practice of this invention that it is possible to successfully prepare butadiene-acrylonitrile elastomeric copolymers in emulsion at polymerization temperatures in excess of 50° C. and preferably in the range of 90 to 150° C. by using recipes especially constructed for that purpose. The critical variable in these new high-temperature recipes is the polymerization initiator concentration. Conventional, 50° C., emulsion polymerization recipes utilize initiator concentrations of the order of about 0.2 to 1.0 percent. Potassium persulfate is a commonly known and widely used initiator. However, sodium persulfate or ammonium persulfate may also satisfactorily be used.

A further variable in the practice of this invention is the polymerization time, which may vary from one-half hour to six hours, depending upon the polymerization temperature and the initiator concentration. An excellent indication of the proper polymerization time is the percent conversion of the monomers to the desired copolymer. A conversion of 60 to 70 percent at any given polymerization time and initiator concentration is preferred.

When conventional recipes, containing these quantities of initiators, are used at high polymerization temperatures, the initiator is decomposed very rapidly with a resulting "dying-out" of the reactions. The polymerization reactions level off very quickly when the source of free radicals, the initiator, is depleted. As a result, the polymerization times are so short as to make accurate control virtually impossible. The inferior quality of products obtained from such polymerizations has already been pointed out.

It has been found, in the practice of this invention, that suitable control of such high-temperature emulsion polymerizations is possible by utilizing recipes constructed to work effectively at relatively high polymerization temperatures. The essential feature of the recipes is the initiator concentration, potassium persulfate or other persulfate, as described above, which is considerably lower than that used in known low-temperature recipes. This initiator concentration has been found to be a critical variable, relatively small changes spelling the difference between controllable, reproducible reactions leading to useful products and uncontrollable, non-reproducible reactions leading to inferior and nonuniform products. The preferred range, with respect to persulfate concentration in high-temperature emulsion polymerization recipes, has been found to be 0.002 to 0.05 part by weight per 100 of monomers.

The following examples are submitted for the purpose of illustrating the present invention and are not to be construed as limiting or restricting it thereto. In all examples, the proportions are given in parts by weight.

EXAMPLE I

A copolymer of butadiene-acrylonitrile was obtained at a polymerization temperature of 90° C. with a polymerization time of 5 hours by the addition to 180 parts of water of 1.5 parts of soap (Dresinate 731, manufactured by Hercules Powder Company, Wilmington, Delaware), 0.6 part of potassium chloride, and 0.004 part of potassium persulfate; to this aqueous phase were added 45 parts acrylonitrile, 1 part of t-Octyl mercaptan, and 55 parts of 1,3-butadiene.

EXAMPLE II

A copolymer of butadiene-acrylonitrile was obtained in the same manner as Example I, except that the recipe used 35 parts acrylonitrile and 65 parts 1,3-butadiene.

EXAMPLE III

A copolymer of butadiene-acrylonitrile was obtained at a polymerization temperature of 120° C. with a polymerization time of 2 hours by the addition to 180 parts of water of 3 parts of soap (P & G SF Flakes manufactured by Procter and Gamble, Cincinnati, Ohio), 0.6 part of potassium chloride, and 0.006 part of potassium persulfate; to this aqueous phase were added 25 parts acrylonitrile, 3 parts of t-Octyl mercaptan, and 75 parts of 1,3-butadiene.

EXAMPLE IV

Copolymers of butadiene-acrylonitrile prepared according to Examples I, II, and III were compounded in a standard test recipe consisting of 100 parts of copolymer, 40 parts of carbon black (Statex B, distributed by the Binney and Smith Company, New York City, New York), 5 parts zinc oxide, 1.25 parts sulfur, and 1.75 parts of rubber accelerator (Altax, manufactured by the R. P. Vanderbilt Company, New York, N. Y.). The compounds were vulcanized at a temperature of 144° C.

The soap present in the above examples is used to effect emulsification of the butadiene and acrylonitrile in the aqueous solution. The amount of soap by weight per 100 of monomers is that amount which will afford a stable emulsion at any given temperature, and ranges from 1½ to 10 parts by weight.

The potassium chloride, an electrolyte, is used to promote large particle size and consequent low viscosity in the emulsion. The amount of electrolyte used and the criticality of low viscosity to heat transfer within the emulsion is well known in the prior art.

The test recipes set forth in Examples I, II, and III above indicate that a controllable polymerization may take place using conventional ingredients at elevated temperatures where such reactions have heretofore not been possible. Further, in the practice of this invention, it is possible to produce useful butadiene-acrylonitrile copolymers which have excellent physical properties as a result of being prepared at temperatures higher than normal and by virtue of the controllable and reproducible reactions obtained at these elevated temperatures.

A surprising and unexpected result of the use of these new recipes at elevated temperatures is that the butadiene-acrylonitrile copolymers prepared by this process show considerable improvement in the balance of two diametrically opposed properties, that is, oil resistance and low-temperature flexibility.

Further, the controllable, high-temperature process is particularly adapted to continuous production methods as, for example, polymerization conducted in such a manner that the emulsion flows continuously through a tube or pipe. In such a process, rapid conversion coupled with good reproducibility of results is desirable. These conditions are met in the practice of this invention.

By way of illustration, the improved physical properties are set forth below in tabular form, and are as follows: Table I contains stress-strain data, the elastomers tested having been prepared as shown in Examples I and II and compounded as shown in Example IV. Table II contains oil-resistance and low-temperature data for the same two compounds. Table III indicates the improvement in the balance of oil-resistance and low-temperature properties due solely to the increased polymerization temperature. The 120° C. and 90° C. polymerized elastomers in Table III were prepared in accordance with the process disclosed in the present invention, while the 50° C. elastomer was prepared by a conventional, prior-art process. All of the copolymers in Table III were compounded as shown in Example IV. In Table II, the swell, percent is a value which gives oil resistance and is expressed in terms of percent swell on vulcanizates cured 30, 60, and 90 minutes when immersed for 24 hours in Reference Fuel No. 2. As used in Tables II and III, the TR–10 and TR–70 values will be recognized as indicative of low-temperature serviceability of the elastomers, as is well known in the art.

Table I.—Stress-strain data

| Designation | Polymer Nitrile, Percent | Time, Min. | 300 Percent Modulus, p. s. i. | Tensile Strength, p. s. i. | Elongation, Percent |
|---|---|---|---|---|---|
| Ex. I | 31.8 | 30 | 1,680 | 2,820 | 420 |
|  | 31.8 | 60 | 2,140 | 2,630 | 340 |
|  | 31.8 | 90 | 2,160 | 3,050 | 370 |
| Ex. II | 28.6 | 30 | 1,095 | 2,370 | 515 |
|  | 28.6 | 60 | 1,120 | 2,470 | 520 |
|  | 28.6 | 90 | 1,250 | 2,490 | 505 |

Table II.—Oil-resistance and low-temperature data

| Designation | Polymer Nitrile, Percent | Time, Min. | Swell, Percent[1] | TR–70, ° C. | TR–10, ° C., Average |
|---|---|---|---|---|---|
| Ex. I | 31.8 | 30 | 41.2 | −19 | −28 |
|  | 31.8 | 60 | 40.8 | −18 | −28 |
|  | 31.8 | 90 | 40.6 | −19 | −28 |
| Ex. II | 28.6 | 30 | 54.4 | −16 | −34 |
|  | 28.6 | 60 | 54.9 | −17 | −34 |
|  | 28.6 | 90 | 54.4 | −16 | −34 |

[1] 24-hour immersion in Reference Fuel No. 2.

Table III

| Polymerization Temperature, ° C. | Polymer Nitrile, Percent | Time, Min. | Swell, Percent[1] | TR–70, ° C. | TR–10, ° C., Average |
|---|---|---|---|---|---|
| 120 | 25.5 | 30 | 71.2 | −22 | −39 |
| 120 | 25.5 | 60 | 71.6 | −24 | −39 |
| 120 | 25.5 | 90 | 71.5 | −22 | −39 |
| 90 | 25.5 | 30 |  |  |  |
| 90 | 25.5 | 60 | 78.0 | −19 | −39 |
| 90 | 25.5 | 90 |  |  |  |
| 50 | 25.5 | 30 |  |  |  |
| 50 | 25.5 | 60 | 90 | −25 | −39 |
| 50 | 25.5 | 90 |  |  |  |

[1] 24-hour immersion in Reference Fuel No. 2.

Thus, it may readily be seen that the elastomers polymerized in accordance with the practice of this invention, when compounded and vulcanized, have a superior balance of oil-resistant properties and low-temperature properties.

This invention is a result of considering the known art and applying thereto the newly discovered principle, namely, that high-temperature polymerization does result in superior oil-resistance, low-temperature and other properties. In order that this high-temperature polymerization may be successfully carried out, it has been found that the use of very small amounts of initiator will reduce the critical point in conducting such high-temperature polymerizations.

While the particular embodiments of the invention have been shown and described, it will be obvious to those skilled in the art that various changes and modifications may be made without departing from the invention in its broader aspects and, therefore, the appended claims are intended to cover all such changes and modifications as fall within the true spirit and scope of the invention.

What is claimed is:

1. In the emulsion copolymerization of butadiene with acrylonitrile in the presence of a mercaptan the step whereby butadiene-acrylonitrile copolymers are produced capable of imparting improved oil-resistance and low-temperature flexibility characteristics to vulcanizates compounded therefrom, comprising: conducting the copolymerization reaction at a temperature of from 90° C. to 150° C. with from 0.002 to 0.05 percent based on the weight of the butadiene and the acrylonitrile of a polymerization initiator selected from the group consisting of sodium persulfate, potassium persulfate, and ammonium persulfate.

2. In the emulsion copolymerization of butadiene with acrylonitrile in the presence of a mercaptan, the step whereby butadiene-acrylonitrile copolymers are produced capable of imparting improved oil-resistance and low-temperature flexibility characteristics to vulcanizates compounded therefrom, comprising: conducting the copolymerization reaction at a temperature of about 120° C. with from 0.002 to 0.05 percent based on the weight of the butadiene and the acrylonitrile of a polymerization initiator selected from the group consisting of sodium persulfate, potassium persulfate, and ammonium persulfate.

3. A process for the formation of a copolymer of butadiene-acrylonitrile capable of imparting improved oil-resistance and low-temperature flexibility characteristics to vulcanizates compounded therefrom, comprising: polymerizing 25 to 45 parts acrylonitrile with 55 to 75 parts of 1,3-butadiene in an aqueous emulsion at a temperature of from 90° C. to 150° C. in the presence of 1 to 3 parts of a mercaptan and 0.002 to 0.05 parts of a polymerization initiator selected from the group consisting of sodium persulfate, potassium persulfate, and ammonium persulfate, said parts of mercaptan and initiator based on 100 parts by weight of the butadiene and the acrylonitrile.

References Cited in the file of this patent

UNITED STATES PATENTS

| | | |
|---|---|---|
| 2,462,742 | Hallowell | Feb. 22, 1949 |
| 2,535,557 | Walton | Dec. 26, 1950 |
| 2,600,679 | Park | June 17, 1952 |